US010905054B2

(12) United States Patent
Hamilton

(10) Patent No.: US 10,905,054 B2
(45) Date of Patent: Feb. 2, 2021

(54) CONTROLLING THE OPERATION OF FORESTRY MACHINES BASED ON DATA ACQUISITION

(71) Applicant: Deere & Company, Moline, IL (US)

(72) Inventor: Robert A. Hamilton, Raymond, IA (US)

(73) Assignee: Deere & Company, Moline, IL (US)

(*) Notice: Subject to any disclaimer, the term of this patent is extended or adjusted under 35 U.S.C. 154(b) by 155 days.

(21) Appl. No.: 16/189,672

(22) Filed: Nov. 13, 2018

(65) Prior Publication Data
US 2020/0146226 A1 May 14, 2020

(51) Int. Cl.
*A01G 23/081* (2006.01)
*G08G 1/13* (2006.01)
*G05D 1/00* (2006.01)
*G06N 20/00* (2019.01)
*G08G 1/00* (2006.01)

(52) U.S. Cl.
CPC ......... *A01G 23/081* (2013.01); *G05D 1/0088* (2013.01); *G06N 20/00* (2019.01); *G08G 1/13* (2013.01); *G08G 1/20* (2013.01)

(58) Field of Classification Search
CPC .. A01G 23/081; G05D 1/0088; G05D 1/0297; G05D 2201/0201; G06N 20/00; G08G 1/20; G06Q 10/0631; G06Q 10/047; G06Q 50/02; G01C 21/3407; G01C 21/3469
See application file for complete search history.

(56) References Cited

U.S. PATENT DOCUMENTS

| | | | | |
|---|---|---|---|---|
| 7,218,975 B2* | 5/2007 | Stevens | ................... | A01G 23/00 144/335 |
| 2004/0250908 A1* | 12/2004 | Hicks | ..................... | A01G 23/00 144/335 |
| 2009/0278839 A1* | 11/2009 | Geis | ....................... | B60K 35/00 345/418 |

(Continued)

FOREIGN PATENT DOCUMENTS

| | | |
|---|---|---|
| EP | 3488686 A1 | 5/2019 |
| WO | WO2014122364 A1 | 8/2014 |
| WO | 2018042077 A1 | 3/2018 |

OTHER PUBLICATIONS

"Path tracking in forest terrain by an autonomous forwarder" Article in Scandinavian Journal of Forest Research • Aug. 2011, DOI: 10.1080/02827581.2011.566889.

(Continued)

*Primary Examiner* — Michael J Zanelli
(74) *Attorney, Agent, or Firm* — Joseph R. Kelly; Kelly, Holt & Christenson, PLLC

(57) ABSTRACT

A control system receives information indicative of characteristics of tree bundles that are felled at various locations in a forestry site. The control system receives information indicative of characteristics of the various machines that can be deployed at the forestry site. It includes a solution generation system that generates solutions indicative of which equipment should be deployed, to different locations in the forestry site, and particular routes over which the deployment is to occur. Control signals can be generated to control the equipment based on the generated solutions.

20 Claims, 12 Drawing Sheets

(56) References Cited

U.S. PATENT DOCUMENTS

2020/0208984 A1* 7/2020 Boydens ............ G01N 33/0098

OTHER PUBLICATIONS

"Reduced forest soil damage advanced machine routing and motion planning" Last Changed: Jan. 15, 2018, https://www.slu.se/en/departments/forest-biomaterials-technology/research/ongoing-proje...

German Search Report issued in counterpart application No. 102019215578.2 dated Jul. 22, 2020 (08 pages).

* cited by examiner

CONTROLLING THE OPERATION OF FORESTRY MACHINES BASED ON DATA ACQUISITION

FIELD OF THE DESCRIPTION

The present description relates to controlling forestry operations. More specifically, the present description relates to controlling the operation of forestry machines by finding deployment and/or operational solutions based on selected criteria.

BACKGROUND

In a forestry operation, tree felling machines (such as wheel feller bunchers or track feller bunchers) cut and lay down trees either individually, or in bundles. A skidder (or forwarder or yarder) is a machine that transports the bundles of trees from the location where they were felled to a separate location where they are processed further (such as where they are delimbed, sorted, loaded or chipped).

At the processing location, the delimbing, sorting, and loading operations can be performed by a knuckle boom loader or by other equipment. The processed trees are then loaded onto a transport vehicle where they are taken to another processing facility, such as a mill.

All of these types of forestry machines can come in different sizes, and can have different capabilities and characteristics. For instance, skidders can come in different sizes and have a grapple that is used to capture and carry a bundle. The skidders may also have a cable/winch mechanism that is used to capture and carry the bundles. The capturing mechanisms can be rated to accommodate different weights, volumes, etc.

In addition, some feller bunchers and skidders may be better suited to traverse certain types of terrain than other skidders and feller bunchers. They may be configured to traverse different types of terrain more easily or efficiently (with respect to fuel consumption, speed, etc.). Similarly, they may be configured so that different machines cause different levels of disturbance or damage to the forest floor, when they traverse it.

The discussion above is merely provided for general background information and is not intended to be used as an aid in determining the scope of the claimed subject matter.

SUMMARY

A control system receives information indicative of characteristics of tree bundles that are felled at various locations in a forestry site. The control system receives information indicative of characteristics of the various machines that can be deployed at the forestry site. It includes a solution generation system that generates solutions indicative of which equipment should be deployed, to different locations in the forestry site, and particular routes over which the deployment is to occur. Control signals can be generated to control the equipment based on the generated solutions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
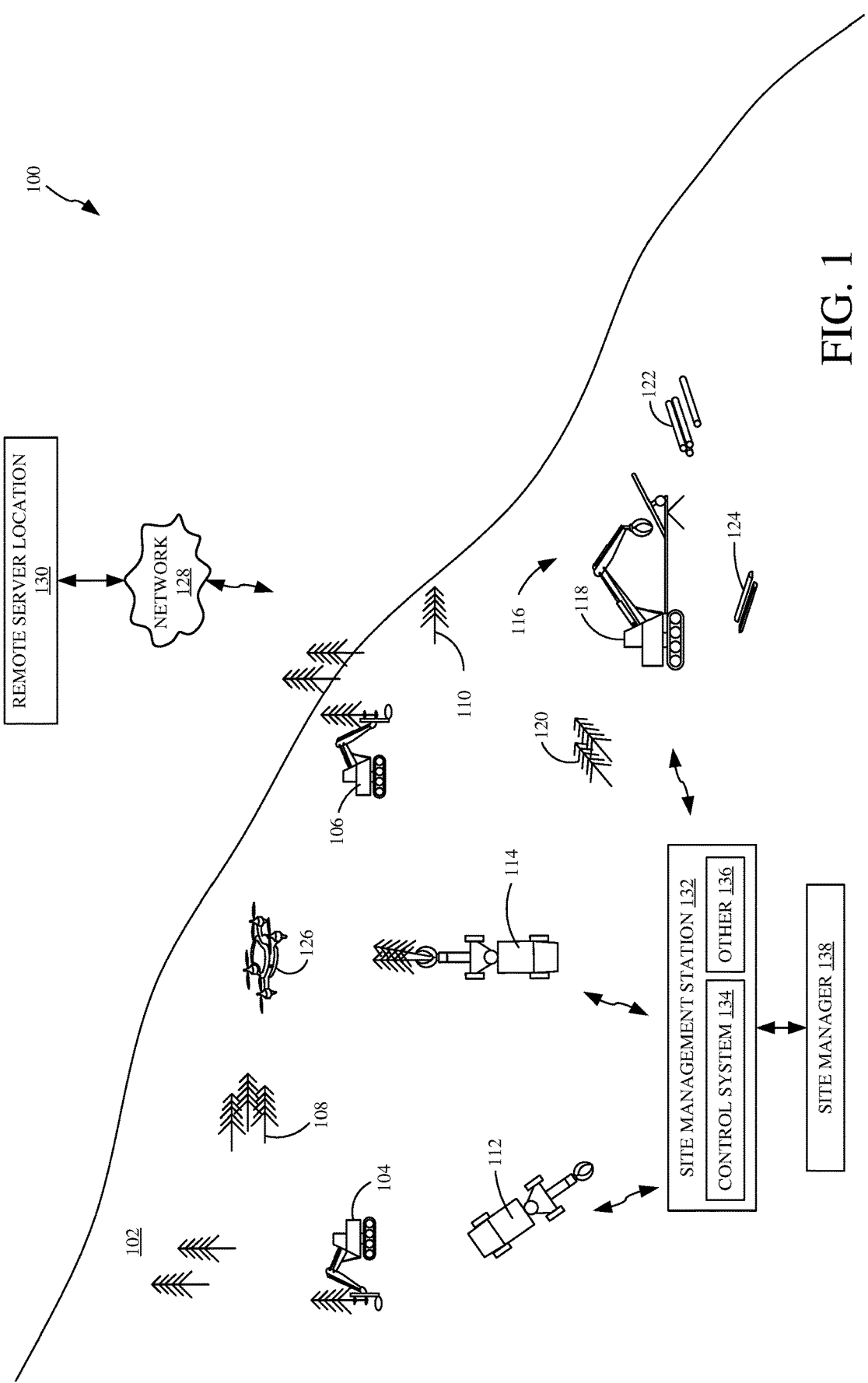
FIG. 1 is a partial pictorial, partial block diagram of one example of a forestry site.

FIG. 1 is a partial block diagram, partial pictorial diagram, showing one example of a forestry architecture 100 that is deployed at a forestry site 102. The forestry site 102 is located on generally uneven terrain and shows two different feller bunchers 104-106 that are cutting trees and laying them in bundles 108-110. FIG. 1 also shows that, in one example, multiple different skidders 112-114 are used to transport the trees from the locations of bundles 108-110 to a further processing location 116 where the trees can be delimbed, cut to length, sorted, etc. In the example shown in FIG. 1, location 116 includes a knuckle boom loader 118 that takes trees 120 delivered by skidders 112-114, delimbs them and sorts them into piles 122-124 based upon selected characteristics, such as based upon whether the trees are hardwood, softwood, wood that is to be chipped, etc.

FIG. 1 also shows that, in one example, an unmanned aerial vehicle (UAV) 126 can be deployed to different locations at site 102. UAV 126 can be controlled in an automated fashion or by an operator.

UAV 126, and each of the different machines 104, 106, 112, 114 and 116 can have data gathering systems disposed on them that can gather a wide variety of different types of data. For instance, feller bunchers 104-106 may have data gathering systems (such as GPS receivers, or other positioning systems) that identify the geographic position of feller bunchers 104-106. Therefore, they can also identify the geographic location of the bundles 108-110 of trees that are being generated by feller bunchers 104-106. The data gathering systems can have a wide variety of other data detectors which detect such things as fuel consumption of the machine they are disposed on, the route over which the machine has traveled, the condition of the terrain over which the machine has traveled, and different characteristics of the bundles of trees 108-110 that are being generated. One example of a data gathering system is described in greater detail below with respect to FIG. 3.

Also, in one example, skidders 112 and 114 can have data gathering systems on them that gather a variety of different types of data, as can UAV 126. The different data gathering systems in architecture 100 can transmit the data that they gather through network 128, to a remote server location 130, and/or to site management station 132. Network 128 can be a wide variety of different types of networks, such as a cellular communication network, a wide area network, a local area network, a near field communication network, or a wide variety of other networks or combinations of networks. In addition, the data gathered by the data gathering systems can be transported in other ways as well, some of which are described in greater detail below.

The data gathering systems can also illustratively transmit data among the machines. For instance, a data gathering system on feller buncher 104 can illustratively transmit its data to a data gathering system on skidder 112 (e.g., when the two are in close proximity to one another). Then, when skidder 112 comes within close proximity of site management station 132, it can transmit the data that it has gathered, itself, and the data received from feller buncher 104, to site management station 132. These and other mechanisms for transmitting data are contemplated herein.

Site management station 132 illustratively includes control system 134, and it can include a wide variety of other items 136. Site management station 132 is accessible by site manager 138 who can interact with control system 134 in order to control various operations at forestry site 102.

Figure 2:
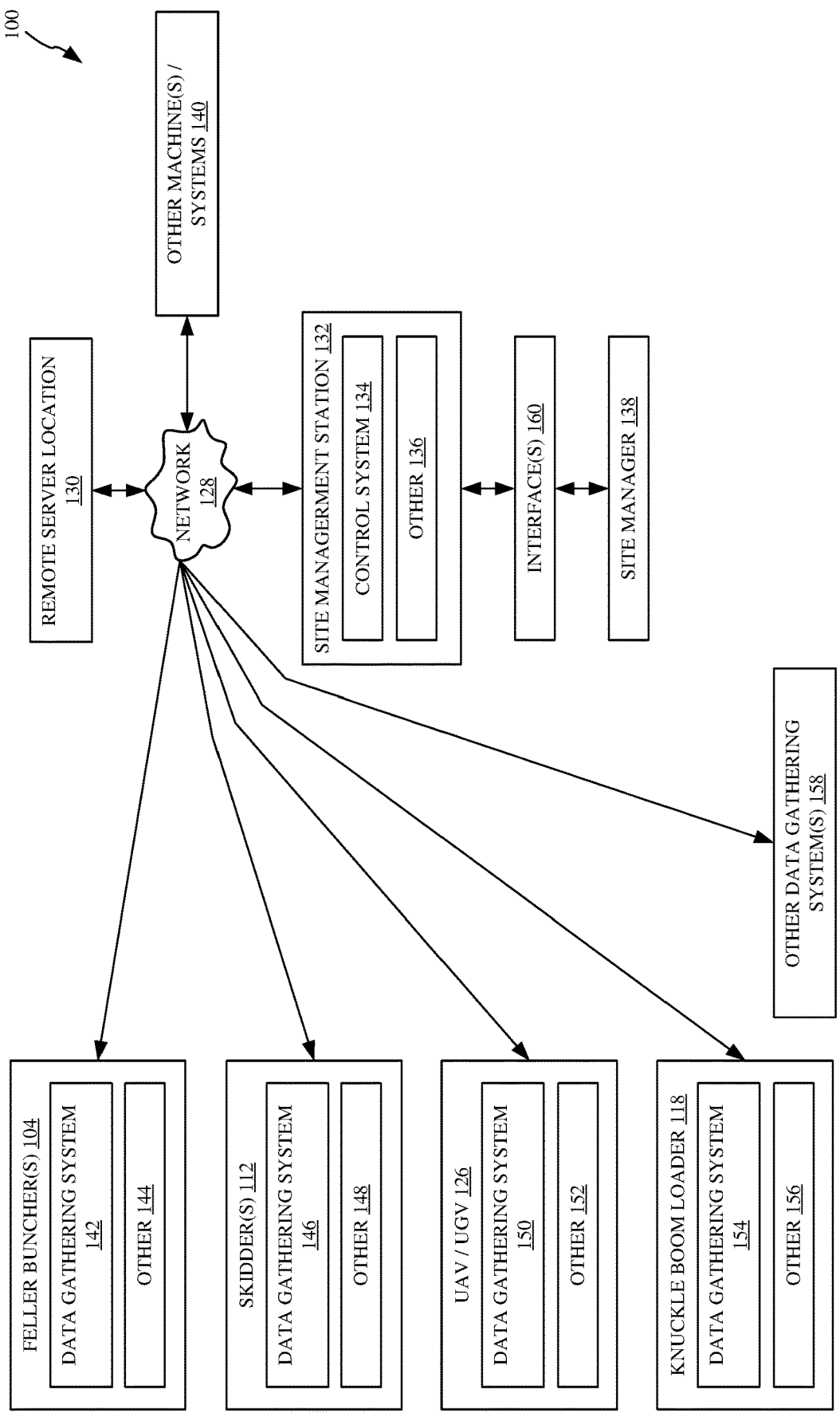
FIG. 2 is a block diagram showing some of the items illustrated in FIG. 1, in more detail.

FIG. 2 is a block diagram showing some of the items illustrated in FIG. 1, in more detail. FIG. 2 specifically shows feller buncher 104, skidder 112, UAV/UGV 126, knuckle boom loader 118, remote server location 130, site management station 132 and site manager 138, as well as network 128. In addition, FIG. 2 shows that architecture 100 may include a wide variety of other machines or other systems 140. FIG. 2 also shows that each of the machines 104-112, 118 and 126 can have a data gathering system. For instance, feller buncher 104 can have data gathering system 142 and also includes a wide variety of other functionality 144. Skidder 112 illustratively has a data gathering system 146 and can have a wide variety of other functionality 148 as well. UAV 126 (which can also be an unmanned ground vehicle (or UGV)) can have data gathering system 150 and a wide variety of other functionality 152. Knuckle boom loader 118 can include data gathering system 154 and also includes a wide variety of other functionality 156. Architecture 100 can include other data gathering systems 158 disposed on other machines, or located in other locations as well. Each of the data gathering systems 142, 146, 150, 154 and 158 illustratively detect and gather data (some of which is described in more detail with respect to FIG. 3 below) and can communicate it to the other machines or site management station 132 and/or server location 130 and other machines or systems 140, over network 128, or in other ways.

FIG. 2 shows that, in one example, control system 134 in site management station 132 receives the acquired data and generates interfaces 160 with user input mechanisms for interaction by site manager 138. Site manager 138 illustratively interacts with the user input mechanisms on interfaces 160 in order to control and manipulate control system 134 and possibly other machines or other systems with which site management station 132 can communicate. While the operation of the data gathering systems and control system 134 is described in greater detail below, some examples will now be briefly discussed.

In one example, data gathering system 142 on feller buncher 104 gathers data such as the geographic position of where feller buncher 104 is laying down bundles of trees. It can also gather data indicative of the types of trees, and the characteristics of the bundles. For instance, it may detect whether the trees are hardwood or softwood, the number of trees in a given bundle (or in a set of bundles that are closely proximate one another) and the dimensions of the bundle (such as the number of stems per bundle, the diameter at breast height of the trees, the weight, length and volume of the individual trees or bundles), or other information. Data gathering system 142 may also gather data indicative of the terrain condition on the forest floor (such as whether it is wet and muddy, dry, rocky, soft, etc.). It can also gather data indicative of the position of feller buncher 104 (e.g., its elevation, orientation, geographic location, etc.). Based on this information, it can generate a topographical map or topographical indications that identify the topography of the terrain over which it is traveling. Data gathering system 142 can have a communication system that communicates this information back to control system 134 in site management station 132.

Data gathering system 146 in skidder 112 may identify the geographic location of skidder 112, its orientation and heading, its speed, the characteristics of the skidder on which it is disposed (e.g., the size/model of the skidder, the type (wheel, track, etc.) of the skidder, the skidder dimensions, etc.). This information can be provided to control system 134 as well. Similar information can be provided from other feller bunchers, other skidders, from knuckle boom loader 118, etc.

Control system 134 then uses this information to identify a set of solutions which indicate how machines are to be deployed at forestry site 102. For instance, it may generate solutions indicating which skidders should proceed to which bundle locations in order to pick up those trees and bring them back to the sorting location where knuckle boom loader 118 is operating. If there are multiple sorting locations, with multiple knuckle boom loaders, then the solutions may identify the particular sorting location that a particular skidder is supposed to take its trees to. Similarly, the solutions may identify which skidders are to move to which locations to pick up bundles. This may be based on the configuration of the skidder (so that it does not damage the forest floor, or so that it proceeds with a relatively high fuel economy, etc.). The solutions may identify the particular route that a skidder or machine may take. For instance, it may be that, based upon a topographical map of site 102 (or the topographical information generated by the data gathering system 142 on feller buncher 104, or from the other data gathering systems) the topography of the site 102 can be used to identify a route that a skidder may take to a bundle of trees that have been felled by a feller buncher. As an example, the routes can be sorted based on how quickly the skidder can traverse the route, based upon the fuel consumption that will be encountered by the skidder in traversing the route, based upon the safety of the route (which may, itself, be based upon the grade of the route, the width of the route, etc.), among other things.

The solutions may also control other machines, such as the feller bunchers. For instance, it may be that a sorting location where a knuckle boom loader is located needs more hardwood trees or softwood trees to process. In that case, the solutions may control the feller bunchers to harvest more softwood trees. Harvesting particular tree types may be done using a tree inventory map that was previously generated or by generating an instruction on an operator interface in the feller buncher to harvest a certain type of tree or in other ways. Similarly, it may be that a processing facility (such as a mill) is paying proportionally more on a certain day for hardwood than softwood (or vice versa). In that case, the solutions may account for that information and control the feller bunchers to preferentially target one type of wood over another. All of these and other solutions (some of which are described below) can be generated by control system 134.

Control system 134 can then generate control signals based on the identified solutions, and provide those control signals to control various things in architecture 100. For example, the control signals may be navigation control signals that are provided to skidder 112 and automatically control the navigation system on skidder 112 to move the skidder along a route to a particular location where a bundle of trees is located. It may control a navigation system on UAV/UGV 126 to move the vehicle to a different location. It may control a navigation system on knuckle boom loader 118 to move it to a new sort location (such as a location that may be closer to the feller bunchers or more easily accessible by the skidders, etc.). It may generate navigation control signals to control the navigation of the feller buncher 104. It may also generate control signals to control the operator interface logic in site management station 132 or in the various machines so that the operators of those machines (and/or site manager 138) can view the different solutions and select from among those solutions. Similarly, it may control the operator interface logic to surface a specific solution for an operator in a given machine. By way of example, it may surface a solution for an operator of one skidder to take a particular route, and it may surface a solution for the operator of another skidder so that that operator may take a different route to a different bundle of trees. These and other solutions and control signals are described in greater detail below.

Figure 3:
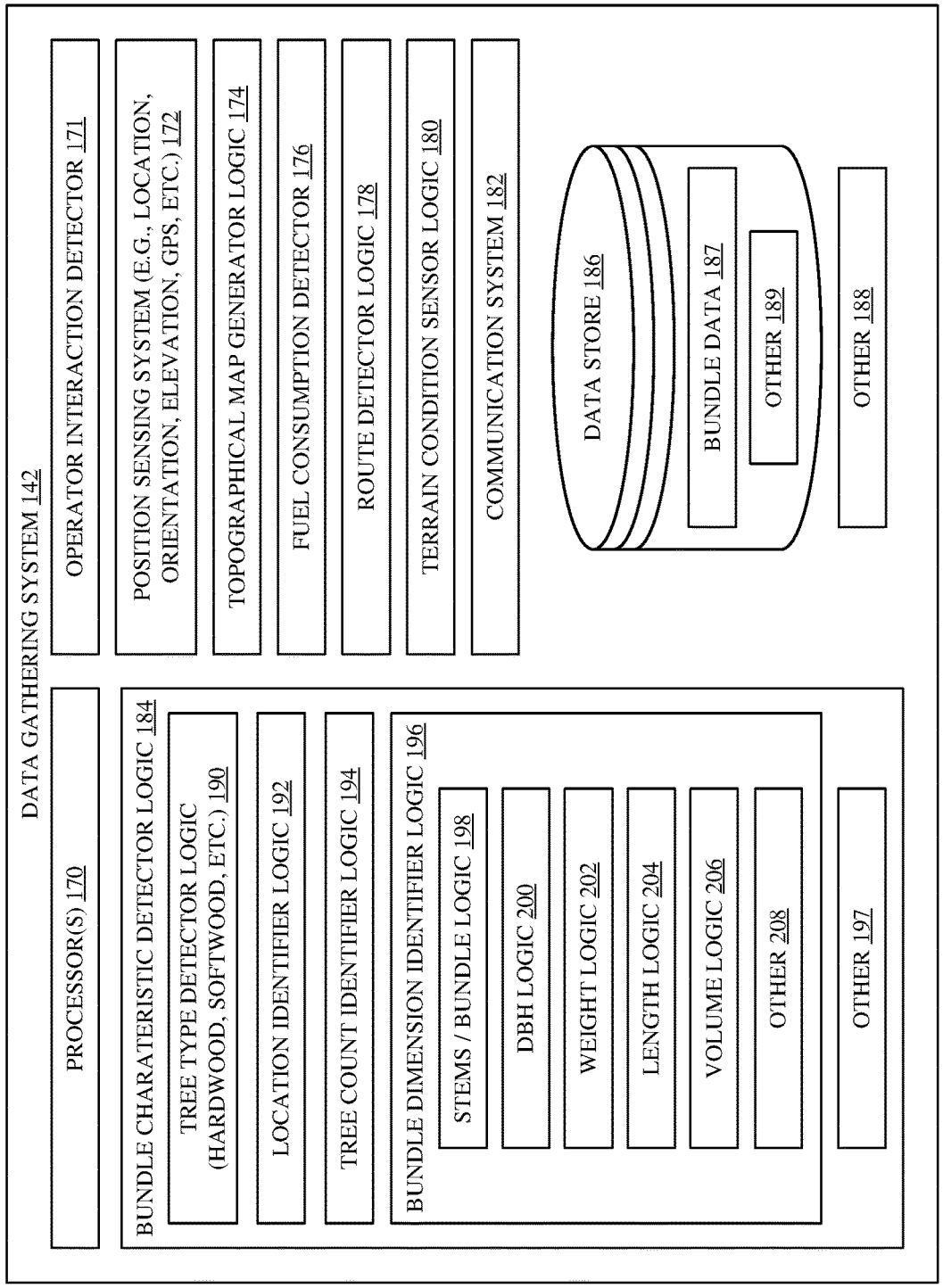
FIG. 3 is a block diagram showing one example of a data gathering system, in more detail.

FIG. 3 is a block diagram showing one example of a data gathering system (e.g., data gathering system 142) in more detail. It will be appreciated, that the various data gathering systems discussed above with respect to FIG. 2 can be similar, or different from that shown in FIG. 3. There are assumed for the sake of the present description to be similar, so that only data gathering system 142 is described in more detail.

In the example shown in FIG. 3, data gathering system 142 illustratively includes processor 170, position sensing system 172 which senses a machine pose (location, orientation, elevation) which can be sensed by a GPS receiver, accelerometers, etc.) 172, topographical map generator logic 174, fuel consumption detector 176, route detector logic 178, terrain condition sensor logic 180, communication system 182, bundle characteristic detector logic 184, data store 186, and it can include a wide variety of other items 188. Bundle characteristic detector logic 184, itself, can include tree type detector logic 190, location identifier logic 192, tree count identifier logic 194, bundle dimension identifier logic 196, and other items 197. Bundle dimension identifier logic 196 illustratively identifies the dimensions of various bundles of trees that have been cut and placed by feller buncher 104. Thus, it can include stems per bundle logic 198 that senses a number of stems in each bundle, diameter at breast height (DBH) logic 200 that identifies the diameter of each stem, at breast height, weight logic 202 that identifies the weight of the bundle, length logic 204 that identifies the length of stems in the bundle, volume logic 206 that identifies the volumes of stems in the bundle, and it can include a wide variety of other items 208.

A brief description of some of the items in data gathering system 142, and their operation, will now be provided. Position sensing system 172 illustratively senses or detects a pose of feller buncher 104 (or another machine on which system 142 is disposed). For instance, it can be a GPS receiver that senses the pose of the receiver. By knowing the orientation or the receiver as it is mounted on feller buncher 104, it can also identify the pose of feller buncher 104. Further, by knowing the dimensions and position of the boom or lift arm on feller buncher 142, and by detecting when the grapple or tree holding mechanism opens and closes, it can also provide an indication as to the location and orientation of the bundles that are placed by feller buncher 104. Position sensing system 172 can also sense the position of the machine on which it is deployed, over time, and aggregate those values.

These aggregated values (or other values) can be used by topographical map generator logic 174 in order to generate a topographical map of the region over which the machine supporting system 142 is traveling. In one example, for instance, the topographical map generator logic 174 takes elevation and other pose measurements generated by position sensing system 172, at different geographic locations. It uses this information to generate an indication of the topography of the area over which the machine has traveled, and correlates that to the global coordinate system for use as a topographical map.

Fuel consumption detector 176, in one example, can detect fuel consumption in any of a variety of different ways. For instance, it may be that it detects the rate at which fuel is consumed by the machine on which it is mounted. It may be that it uses the geographic position generated by system 172 to identify the rate at which fuel is consumed, as the vehicle travels from one geographic location to the next. It may identify or detect other variables as well, such as engine speed, ground speed, etc. Those variables can be detected based upon their own sensors, or by using the values described herein.

Route detector logic 178 illustratively receives the geographic position values (or pose values) generated by sensing system 172 and aggregates those values to identify a particular route that the machine has taken, based upon those values. It can also use the pose information and topographical information generated by systems 172 and 174, as well as the fuel consumption values generated by detector 176, to identify variables for different routes over the terrain. For instance, where the vehicle on which data gathering system 142 is mounted has traveled multiple different routes, detector logic 178 can detect those routes, and it can also detect the amount of fuel consumed to travel over the routes, the amount of time it took, the various topography that was traversed on each given route, among other things. Route detector logic 178 illustratively generates an output indicative of the characteristics of one or more various routes, along with the other detected variables corresponding to that route.

Terrain condition sensor 180 illustratively senses one or more different variables that are indicative of the condition of the terrain over which the machine is traveling. For instance, it may include a moisture sensor that senses the moisture level of the terrain. It may include an optical sensor, with corresponding image processing logic, that identifies the type and condition of the terrain over which the vehicle is traveling. It can include one or more other sensors that detect the ground softness, that sense soil type (such as dirt, rocks, etc.), types of ground cover (such as leaves, branches, etc.), among other things. It is also contemplated that terrain condition sensor logic 180 can include multiple sensors that sense the condition of the terrain both before the machine travels over it, and afterward. This may provide an indication of the damage or wear that the machine places on the terrain, as it moves over the terrain. Such detector logic can detect things such as ruts, the depth of displaced soil, among other things.

Communication system 182 is configured to communicate with other data gathering systems, with remote server location 130 (shown in FIG. 2), with site management station 132, and other machines/systems 140. Therefore, in one example, it facilitates communication not only among the items on data gathering system 142, with one another, but also communication over network 128.

Data store 186 illustratively stores data generated by any of the other items on data gathering system 142 and/or received by other items in architecture 100.

Bundle characteristic detector logic 184 illustratively detects characteristics of the various tree bundles that are on the forestry site 102. Where data gathering system 142 is disposed on a feller buncher 104, then it detects characteristics of bundles that are generated by feller buncher 142. Where it is disposed on one of the skidders, it may detect characteristics of the bundles, based on data transferred by the feller buncher that formed them. It may also, or instead, identify characteristics of the bundles that are carried by the skidder on which it is disposed. Where the data gathering system is disposed on a UAV/UGV 126, it may identify characteristics of the bundles that are detected by that vehicle. These and other scenarios are contemplated herein.

The characteristics of the bundles are detected so that control system 134 can determine which vehicles should access the bundles, how they should be transported, the particular route that should be used to access and transport them, the order in which bundles should be retrieved, the processing or sorting location they should be taken to, among other things.

Therefore, tree type detector logic 190 detects the type of trees in a given bundle. It may detect the type of tree as a hardwood or softwood tree or a particular species. Detector logic 190 can include operator input logic so that the operator can provide an input indicative of the type of tree. It can also include other detectors, such as optical detectors and image processing logic that is used to identify the type of trees in the bundle. It can use external tree inventory mapping data which may be generated from a different device (e.g., from a UAV) that identifies the types of trees of different geographic locations on the forestry site 102. Tree type detector logic 190 can detect the types of trees in a given bundle in other ways as well.

Location identifier logic 192 illustratively identifies the location and orientation of the bundle. For instance, using the pose information generated by position sensing system 172, and by knowing the physical dimensions of the various parts of the feller buncher, relative to one another (or parts of the skidder relative to one another), the location identifier logic 192 can identify the location and orientation of the trees in a bundle, as they are laid down by the feller buncher (or as they are approached or picked up by a skidder).

Tree count identifier logic 194 illustratively identifies a number of trees felled by a feller buncher. The tree count identifier logic 194 can do this based on an operator input (such as a trigger input or other counting input that is provided by the operator) as he or she harvests trees. It can also do this based on a number of actuations of the saw or grasping arms used by the feller buncher. In addition, it can do this by using an optical sensor and imaging processing logic that identifies individual stems in a bundle. Further, tree count identifier logic 194 can aggregate the number of trees placed in multiple different bundles, or carried by a skidder in different loads, or in other ways.

Stems per bundle logic 198 counts stems in each bundle. It can do this in a similar way that tree count identifier logic 194 identifies the number of harvested trees, and then aggregating the count into count per bundle. It can do this based on an operator input, based on an optical input with image processing logic, or in other ways.

DBH logic 200 generates a metric indicating an average or individual diameter of each of the tree stems at breast height. This can also be done using an optical capture mechanism and image processing logic, or in other ways.

Weight logic 202 illustratively generates an output indicative of a weight of a given bundle. This can be done using weighing mechanisms (e.g., scales) that weigh trees, as they are cut and laid down by the feller buncher, or by weighing mechanisms that weigh trees as they are picked up by the skidder. In one example, the skidder may use other sensors to sense a length of the trees to get an indication of the proportion of the weight of the tree that is being carried by the skidder and the proportion that is dragging on the ground.

Length logic 204 illustratively generates a metric indicative of a length of the trees in a bundle. This can be done based on operator input, based on an optical input, or in other ways.

Volume logic 206 generates an output indicative of a volume of lumber in a bundle. The volume can be generated based on an aggregate of the diameters generated by DHB logic 200 and the length metric generated by length logic 204. This can be used to generate a metric indicative of the volume of a particular stem. The output of stems per bundle logic 198 can be used to generate a metric indicative of the overall volume in a given bundle.

A wide variety of other bundle dimensions can be identified as well. This can be done using a wide variety of other sensors or detector logic 208.

Figure 4:
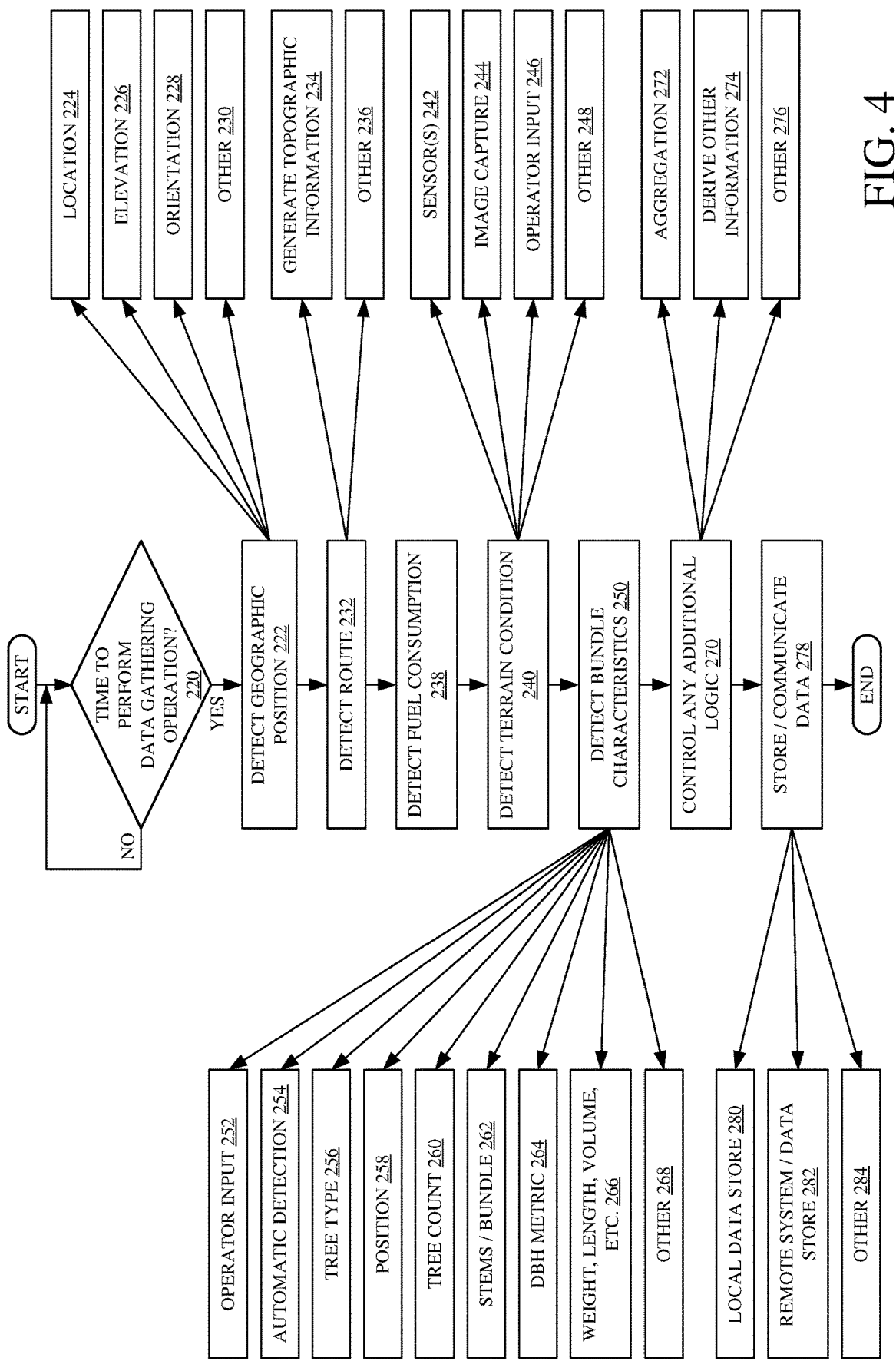
FIG. 4 is a flow diagram illustrating one example of the operation of a data gathering system.

FIG. 4 is a flow diagram showing one example of the operation of data gathering system 142. It will be assumed for the sake of the discussion of FIG. 4 that data gathering system 142 is on feller buncher 104. However, it may be on the other machines identified in FIG. 2 as well. However, it will be appreciated that it could be on the other machines identified in FIGS. 1 and 2 as well.

Processor 170 first determines whether it is time to perform a data gathering operation. In one example, trigger criteria can be used to determine this. For instance, it may be that data gathering operations are performed continuously, periodically, intermittently, or when other criteria are met (such as when the data gathering system reaches a particular location, or otherwise). Determining whether it is time to perform the data gathering operation is indicated by block 220 in the flow diagram of FIG. 4.

When it is time, then the various detectors, sensors, and logic items on data gathering system 142 illustratively detect, sensor or otherwise gather the data. This can be done in a variety of different orders, only one of which is described with respect to FIG. 4, and it is described for the sake of example only.

Position sensing system 142 then senses a pose of data gathering system 142 (and can also generate a pose for the machine on which it is carried, by knowing the orientation of system 142 on that machine). Detecting a geographic position or pose is indicated by block 222. This can include detecting a geographic location (longitude and latitude) 224, elevation 226, orientation (which may include heading, tilt, yaw, roll, or other orientation) 228, and it can include detecting other position information as well. This is indicated by block 230.

Route detector logic 178 can aggregate the various positions to detect the route over which the machine has traveled. This is indicated by block 232. Topographical generator logic 174 can use the position information 172 and route information generated by detector logic 178 to generate topographical information indicative of the topography over which the machine has traveled (or in the vicinity of the machine). Generating topographic information is indicated by block 234. Route detector logic 178 and topographical map generator logic 174 can generate other information as well, and this is indicated by block 236.

Fuel consumption detector 176 also detects a metric indicative of fuel consumption. This is indicated by block 238. It can detect an amount of fuel consumed, or a rate at which the fuel was consumed over different portions of the route. It can generate other information, such as engine speed, ground speed, or other operations that were being performed while the fuel was consumed, or other information related to fuel consumption.

Terrain condition sensor logic 182 illustratively senses terrain condition in the vicinity of the machine, or along the route of the machine. This is indicated by block 240. This can be done using a wide variety of different types of sensors (such as soil type sensors, soil moisture sensors, etc.). This is indicated by block 242. It can be done using image capture and image processing logic, as indicated by block 244. It can be done based on an operator input which identifies the type of terrain, and the condition of the terrain. This is indicated by block 246. It can be done in a wide variety of other ways as well, and this is indicated by block 248.

Bundle characteristic detector logic 184 then detects a variety of different characteristics corresponding to one or more different bundles. Detecting bundle characteristics is indicated by block 250 in the flow diagram of FIG. 4. The bundle characteristics can be provided through operator input, as indicated by block 252. Some or all of them can also be automatically detected as indicated by block 254. Tree type detector logic 190 can detect tree type, as indicated by block 256 and bundle location identifier logic 192 can identify the location of the given bundle, as indicated by block 258. Tree count identifier logic 194 can identify a number of trees felled over a period of time or over an area in a given bundle (or in multiple bundles). This is indicated by block 260. Stems per bundle logic 198 can identify the number of stems in a given bundle (if this is not already identified by logic 194). This is indicated by block 262. DBH logic 200 can provide a metric indicative of DBH. This is indicated by block 264 and the weight, length and volume logic 202, 204 and 206, respectively, can provide outputs indicative of those variables. This is indicated by block 266. A wide variety of other detectors or logic 197 and 208 can provide other bundle characteristics as well. This is indicated by block 268.

All of these types of logic can be controlled by processor 170, or they can be independently controlled or controllable. Processor 170 can then control any additional logic to generate other data as well. This is indicated by block 270 in the flow diagram of FIG. 4. For instance, processor 170 can perform aggregations of variables or data generated or detected by the other sensors or detectors or items in system 142. The aggregation can be aggregating over time, averaging, weighted averaging, aggregated over a geographic position, over distance traveled, over fuel used, over different bundles, etc. Controlling logic to perform aggregation is indicated by block 272. Processor 170 (or other logic) can also derive other data or information from the information generated by the sensors, logic, detectors, etc. described with respect to system 142. Deriving other information from that data is indicated by block 274. Processor 170 can control other logic as well, to obtain other information. This is indicated by block 276.

Processor 170 then controls communication system 182 and/or data store 186 in order to store the data as bundle data 187 in data store 186, and/or to communicate the data to other machines or systems shown in FIG. 2. Controlling data store 186 and communication system 182 to store and/or communicate the data is indicated by block 278 in the flow diagram of FIG. 4. The data can be stored in a local data store 186. This is indicated by block 280. It can be sent to and/or stored in a remote system or data store. This is indicated by block 282. It can be stored or communicated to other machines or other systems as well. This is indicated by block 284.

Figure 5:
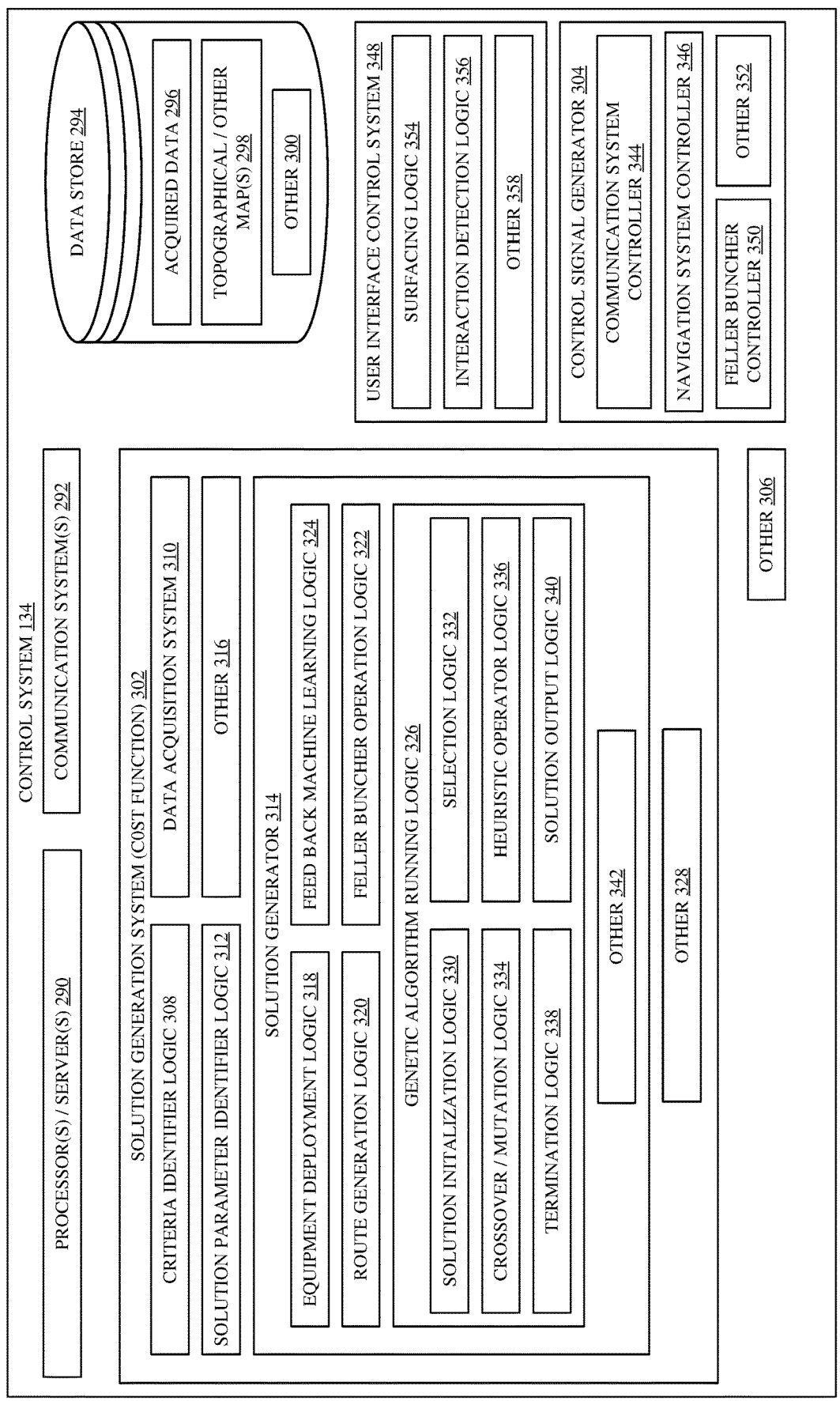
FIG. 5 is a block diagram showing one example of a control system in more detail.

FIG. 5 is a block diagram showing one example of control system 134, in more detail. It will be appreciated that, while the above figures show control system 134 disposed at site management station 132, that need not necessarily be the case. Instead, it can be disposed on any of the machines shown in FIG. 1 or 2, or at remote systems or other locations as well. Providing control system 134 on site management station 132 is shown and described for the sake of example only.

In the example shown in FIG. 5, control system 134 illustratively includes one or more processors or servers 290, communication system 292, data store 294 (which, itself, can include acquired data 296, topological or other maps 298, and other information 300), solution generation system 302, control signal generator 304, and it can include a wide variety of other items 306. Solution generation system 302 illustratively includes criteria (cost function) identifier logic 308, data acquisition system 310, solution parameter identifier logic 312, solution generator 314, and it can include other items 316. Solution generator 314, itself, can include equipment deployment logic 318, route generation logic 320, feller buncher (FB) operation logic 322, feedback machine learning logic 324, genetic algorithm running logic 326, and it can include other items 328. Genetic algorithm running logic 326 illustratively includes solution initialization logic 330, selection logic 332, crossover/mutation logic 334, heuristic operator logic 336, termination logic 338, solution output logic 340, and it can include other items 342.

Control signal generator 304, itself, can include communication system controller 344, navigation system controller 346, user interface control system 348, feller buncher controller 350, and it can include other items 352. User interface control system 348, itself, can include surfacing logic 354, interaction detection logic 356, and it can include other items 358. Before describing the overall operation of control system 134 within architecture 100, a brief description of some of the items in control system 134, and their operation, will first be provided.

Communication system 292 illustratively enables the items in control system 134 to communicate with one another and to communicate with other items in architecture 100 over network 128. The acquired data 296 can be data acquired from the various data gathering systems (e.g., data gathering system 142) in architecture 100. Topographical and other maps 298 can include topographical information generated by the data gathering systems, or it can be data in pre-existing topographical maps or other information, such as maps generated during previous operations at the worksite, or in other ways.

Solution generation system 302 illustratively receives criteria (such as a cost function to be optimized) and solution parameter information (such as a geographic area or time period over which a solution is to be identified) and generates one or more different solutions that indicate how individual forestry machines are to be operated, or how overall operations are to be orchestrated, in order to achieve a desired solution. For instance, a solution can be generated for an individual skidder that identifies where a bundle is to be picked up by that skidder, and a route to be taken in order to get there. It may identify an order in which the skidder is to retrieve a plurality of different bundles and the routes to take. The solution may also identify the particular sorting location that the bundle is to be taken to, by the skidder. The solution may identify how to operate a feller buncher. For instance, it may consider the price of different types of wood, that are available to be harvested at the worksite. It may consider how big the bundles should be that are generated by the feller buncher. It may indicate one or more different locations where the feller buncher is to operate. The solutions can be for a pre-defined area (such as the North face of a worksite, the South face of a worksite, or other individual areas) so that more than one solution is generated for a particular worksite.

System 302 may also generate multiple different solutions for multiple different worksites, that are optimized for (or otherwise processed considering) multiple different criteria so that they can be surfaced for selection by site manager 138 or by the operator of a vehicle or machine. By way of example, it may be that solution generation system 302 surfaces one solution that is optimized for fuel consumption, another solution that is optimized for time. When the site manager selects one of them, then that information can be conveyed to the other operators or vehicles for either operator directed or automated control, to implement the selected solution. Similarly, the solutions can be optimized over multiple different criteria (such as fuel consumption and time and/or other criteria). These and other operations are contemplated herein.

Criteria (cost function) identifier logic 308 illustratively identifies criteria over which the solution is to be optimized (or a cost function that is to be optimized). It will be appreciated that the solution or cost function need not be completely optimized. Instead, an optimization algorithm can be run until a suitable solution is achieved, or until other stopping criteria are met. This is discussed in more detail below.

The criteria or cost function may be a function of desired variables, such as fuel consumption, time, distance traveled, wear on the forest floor, and/or other things. Therefore, once the cost function is identified, solution generation system 302 can generate one or more solutions that take into account one or more of those criteria in the cost function.

Solution parameter identifier logic 312 identifies a particular set of parameters for the solution. For instance, it may be that a first set of solutions is to be generated for a first geographic area of the worksite while a second set of solutions is to be generated for a second geographic area. Similarly, it may be that a first set of machines is available for operation in a first area, and a second set of machines is available for operation in a second area. In that case, the solution can be parameterized by what machines are available for operation in a given solution. Solution parameter identifier logic 312 can identify parameters in other ways as well.

Data acquisition system 310 illustratively acquires data (and can store it as acquired data 296) from the various data gathering systems shown in FIG. 2, or from other sources. In doing so, it can gather the data continuously, intermittently, periodically, or when certain triggering criteria are met.

Once the criteria (or cost function), solution parameters and data are obtained, solution generator 314 illustratively generates a particular solution. Logic 326 then runs an algorithm that generates the various solutions desired. It can run an algorithm that generates routing information that can be provided to route generation logic 320 which generates routes for individual machines. It can generate equipment deployment information indicative of equipment deployment, that can be provided to equipment deployment logic 318 which identifies how individual equipment should be deployed. While logic 326 is described herein as running a genetic algorithm, this is only one example. Other optimization algorithms can be run as well. As mentioned above, once a solution is generated, equipment deployment logic 318 can generate a solution indicating how available equipment are to be deployed in order to carry out the solution. Route generation logic 320 can generate route information indicating a particular route that is to be taken (such as by a skidder, a feller buncher, multiple skiders or feller bunchers or other vehicle). Feller buncher (FB) operation logic 327 can generate a solution indicating how a feller buncher should be operated (such as the location it should operate in, the size of the bundles that should be generated, the particular types of trees that should be harvested, the location where the bundles should be laid, etc.).

Where logic 326 runs a genetic algorithm, solution initialization logic 330 first initializes the solutions, such as by initializing a number of solutions that are not optimized, but which are characterized by the solution parameters and which can be optimized using the cost function. Selection logic 332 then selects solutions for combination or mutation, and those solutions are combined or mutated by crossover/mutation logic 334. Heuristic operator logic 336 can apply heuristic operators to the solutions to combine or mutate them. Selection, crossover/mutation and heuristic operation are performed until some type of termination criteria are reached, at which point termination logic 338 terminates the algorithm. Solution output logic 340 generates an output indicative of the result of running the genetic algorithm to obtain one or more desired solutions. This can be output to various other items in solution generation system 302 so that desired solutions (e.g., multiple different sets of solutions, one or more different solutions for each machine, one or more different solutions for overall operation of the worksite, or other solutions) can be generated.

Feedback/machine learning logic 324 illustratively receives operator feedback or automated feedback indicating how the solutions performed. For instance, if a fuel consumption metric was used indicating an estimated fuel consumption for a particular solution, and that solution is actually carried out, then an actual fuel consumption metric, indicative of the actual fuel consumption, can be fed back to feedback/machine learning logic 324 which can use it to improve the algorithm run by algorithm running logic 326. Similarly, if a solution identifies a route for an operator of a skidder, and the operator encountered terrain that had a grade that could not be traversed by the skidder (for example), so that the operator had to take an alternate route, that information can also be provided (e.g., by operator input, or by an automated output using a navigation system that indicates the alternate route that was actually taken) to feedback/machine learning logic 324. Logic 324 can again use this to improve the solutions generated by solution generation system 302.

Once a set of solutions (one or more solutions) has been generated by solution generation system 302, it is illustratively output to control signal generator 304 which generates control signals to carry out the solution. For example, communication system controller 344 can control communication system 292 to communicate the solution to one or more other items shown in the architecture illustrated in FIG. 2. By way of example, it may control communication system 292 to send an automated navigation solution to a skidder, which is loaded into the navigation system of the skidder and automatically controls the skidder to follow a particular route. It may control the communication system 292 to communicate a route solution to a skidder which is displayed for the operator of the skidder, so that the operator can selectively follow the route. It can control the communication system in other ways as well.

Navigation system controller 346 can generate control signals, based upon the solution, to actually control the machine to follow a route, to navigate to a certain geographic location. It can control the ground speed, heading, engine speed, or other parts of a machine to execute the solution.

User interface control system 348 can generate control signals to surface a set of solutions on a user interface so that one of them can be selected for implementation. For instance, surfacing logic 354 may surface multiple different solutions indicating the criteria over which they are optimized. By way of example, a first solution may be surfaced, indicating that it is optimized for fuel consumption. A second may be surfaced, indicating that it is optimized for time. A third may be surfaced, indicating that it is optimized for distance, etc. Surfacing logic 354 can surface each of the solutions along with a user actuatable input mechanism that can be actuated by a user in order to select a corresponding one of the solutions. User interaction detection logic 356 detects these types of user interactions. When a solution is selected, then control signal generator 304 can generate control signals to carry out the selected solution (e.g., to communicate it to one or more other machines, to automatically control the other machines, etc.).

Feller buncher (FB) controller 350 illustratively generates control signals to control one or more feller bunchers. The control signals may control a wide variety of different functions on the feller buncher, in order to implement a solution. For instance, they can control the feller buncher to move to a particular geographic location, they can control the feller buncher to provide an operator output indicating where bundles of trees should be located. They can be control signals that control an operator interface in the feller buncher indicating the location of trees that are to be cut, the types of trees that are to be cut, and a wide variety of other things. Control signal generator 304 can include other logic or controllers 352, that generate a wide variety of other control signals as well.

Figure 6A:
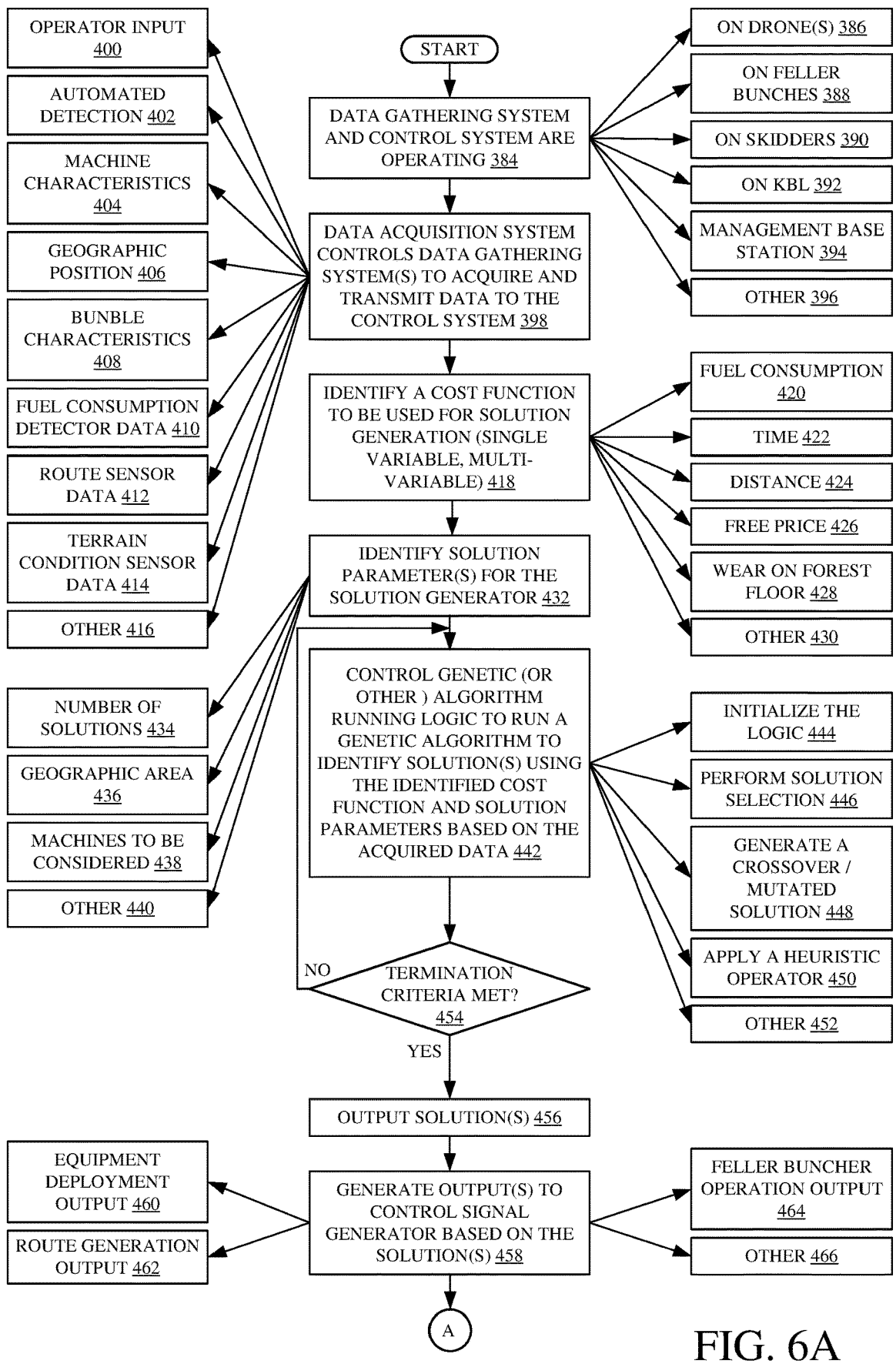
FIGS. 6A and 6B (collectively referred to herein as FIG. 6) show a flow diagram illustrating one example of the operation of the forestry architecture illustrated in FIG. 2 in generating solutions and controlling machines according to those solutions.
Figure 6B:
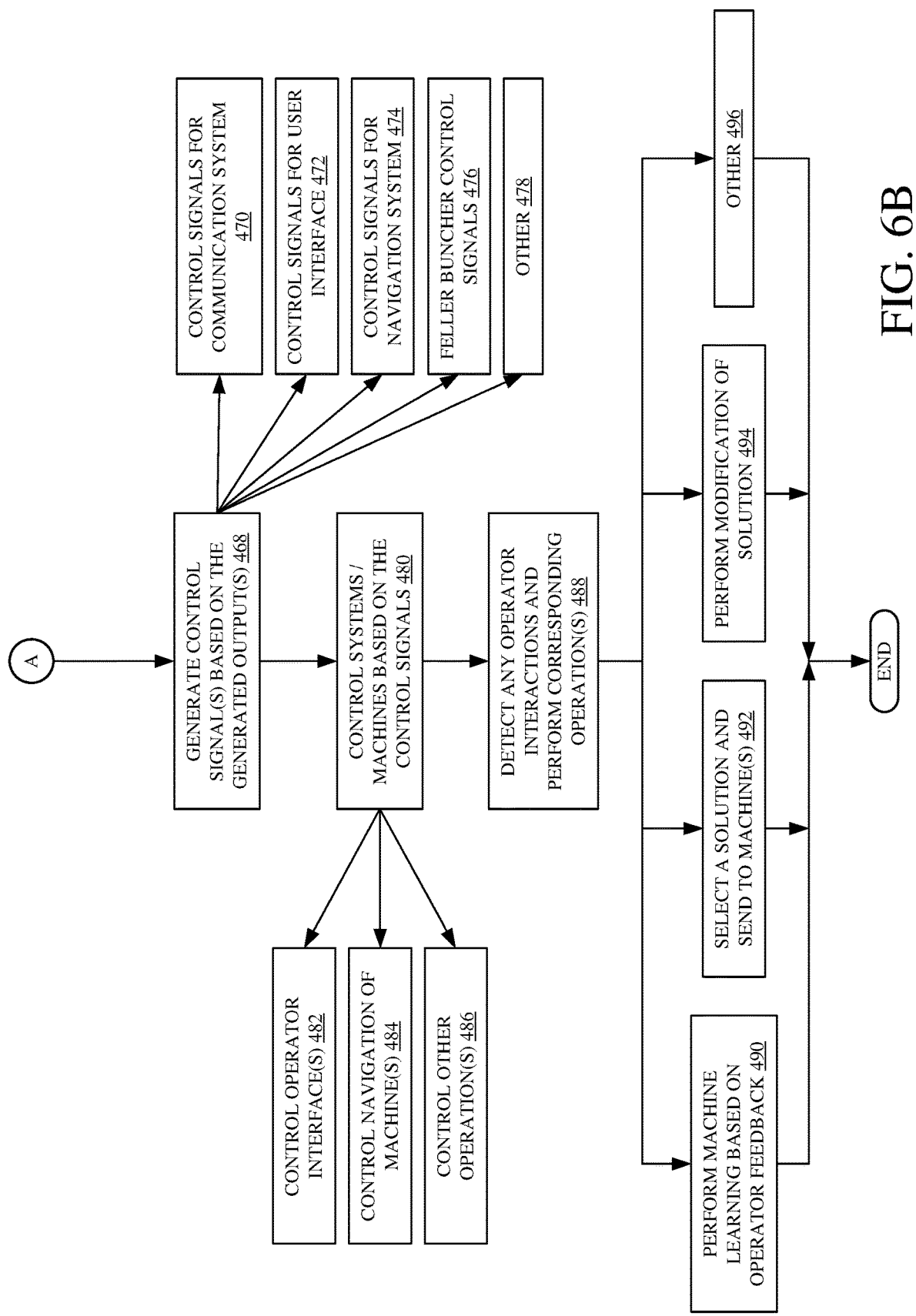

FIGS. 6A and 6B (collectively referred to herein as FIG. 6) show a flow diagram illustrating one example of the operation of the various items in architecture 100 (shown in FIGS. 1 and 2) in acquiring data, generating one or more solutions, and implementing those solutions at a worksite. It is first assumed that the data gathering systems and control system are operating. This is indicated by block 380 in the flow diagram of FIG. 6. They can be on drones (e.g., UAVs/UGVs 126). This is indicated by block 386 in the flow diagram of FIG. 6. They can be on feller bunchers 104 and 106. This is indicated by block 388 in the flow diagram of FIG. 6. They can be on skidders 112-114, as indicated by block 390. They can be on knuckle boom loader 118, as indicated by block 392 and on management station 132 as indicated by block 394. They can be in a wide variety of other places as well, and this is indicated by block 396.

The data acquisition system 310 on control system 304, or the processor 170 on the individual data gathering systems, then controls the data gathering systems to acquire and transmit data to the control system 134. This is indicated by block 398 in the flow diagram of FIG. 6. The data detection or acquisition can be from operator inputs, as indicated by block 400, or based on automated detection as indicated by block 402. The data detection or acquisition can include machine characteristics 404, such as the type, model, size, configuration, etc. of the particular machine from which the data is being acquired. It can include the geographic position 406, bundle characteristics 408, fuel consumption detector data 410, route sensor data 412, terrain condition sensor data 414, and a wide variety of other data 416.

Criteria (cost function) identifier logic 308 then identifies a cost function, or criteria, over which a solution is to be optimized. The criteria can include a single variable, multi-variables, etc. This is indicated by block 418. For instance, the criteria can include fuel consumption 420, time 422, distance 424, tree or lumber price 426, wear on the forest floor 428, and/or it can include a wide variety of other criteria 430.

Solution parameter identifier logic 312 then identifies solution parameters for the solution generator. The parameters, as discussed above, offer parameters for which the solution is to be generated. Identifying the solution parameters is indicated by block 432 in the flow diagram of FIG. 6. The parameters can include a number of solutions to be generated, as indicated by block 434. They can include a geographic area over which solutions are to be generated, as indicated by block 436. They can identify a set of machines that are to be considered in generating the solutions, as indicated by block 438. The parameters can include a wide variety of other parameters as well, and this is indicated by block 440.

Genetic (or other) algorithm running logic 326 then runs a genetic (or other) algorithm to identify solutions using the identified cost function (and/or criteria) and the solution parameters, based on the acquired data. This is indicated by block 442. In one example, solution initialization logic 330 initializes the solution logic as indicated by block 444, with a set of initial solutions. Selection logic 332 performs selection of the various solutions for crossover and mutation. This is indicated by block 446. Crossover/mutation logic 334 then generates a crossover or mutated solution based upon those selected by selection logic 332. Generating the crossover or mutation is indicated by block 448. Heuristic operator logic 336 can apply one or more different heuristic operators as indicated by block 450. The algorithm running logic 326 can run the algorithm in a wide variety of other ways as well, and this is indicated by block 452.

Logic 326 continues to run the algorithm (by selecting and mutating solutions, etc.) until termination logic 338 determines that termination criteria are met. This is indicated by block 454. In one example, the termination criteria may identify a threshold improvement amount. If the solution fails to improve, with each selection and mutation, by at least the threshold amount (e.g., if the cost function changes by less than the threshold amount), then this may mean that the termination criteria are met. This is only one example.

Solution output logic 340 then outputs the solutions that have been generated. This is indicated by block 456. The various items of logic in solution generator 324 can then generate outputs that are provided to control signal generator 304, based upon the identified solutions. This is indicated by block 458. In one example, the logic may simply ensure that the solutions are in a form that can be consumed by control signal generator 304 in generating control signals. In another example, the logic may change or modify the solutions so that they are in a more consumable form. For instance, equipment deployment logic 318 can, based upon the solutions, generate an output identifying particular equipment that is to be deployed to particular locations. This is indicated by block 460. Route generation logic 320 can generate an output identifying which machines are to travel which particular routes (and in what order) in carrying out the solution. This is indicated by block 462. Feller buncher operation logic 322 can generate an output identifying which particular operations are to be controlled, and how, on the one or more feller bunchers. This is indicated by block 464. The outputs to control signal generator 304 can be provided in a wide variety of other ways as well, and this is indicated by block 466.

Control signal generator 304 then generates control signals based upon the outputs received from solution generation system 302. This is indicated by block 468 in the flow diagram of FIG. 6. For instance, communication system controller 344 can generate control signals to control communication system 292. This is indicated by block 470. User interface control system 348 can generate control signals to control a user interface system to generate user interfaces 160 (or other user interfaces on other machines). This is indicated by block 472. Navigation system controller 346 can generate control signals to control a navigation system on one or more machines. This is indicated by block 474. Feller buncher controller 350 can generate control signals to control different operations on one or more feller bunchers. This is indicated by block 476. A wide variety of other control signals can be generated to control a wide variety of other machines as well. This is indicated by block 478.

The control signal generator 304 then uses communication system 292 to send the control signals to the various machines or systems that are to be controlled. The systems or machines are then controlled based on those control signals. This is indicated by block 480. For instance, they can control operator interfaces on other machines, as indicated by block 482. They can control navigation systems to automatically navigate the machines, as indicated by block 484. They can control other operations as well, such as other actuators, settings, etc. This is indicated by block 486.

The operator interaction detectors 171 on the various machines can detect any operator interactions and perform corresponding operations. Similarly, the interaction detection logic 356 on control system 348 can detect operator interactions as well. Detecting operator interactions and performing corresponding operations is indicated by block 488 in the flow diagram of FIG. 6.

Some corresponding operations can be to perform machine learning based on operator feedback that has been detected and communicated to solution generator 314. This is indicated by block 490. Where the operator input is to select one of a plurality of solutions that have been surfaced for the operator, selecting a solution and sending it to a particular machine for implementation is indicated by block 492. It may be that an operator of a machine modifies the solution (such as by changing a suggested route, that is suggested by the solution). Performing a modification of the solution based upon any detected operator input is indicated by block 494. A wide variety of other operator inputs can be detected and other corresponding operations can be performed as well. This is indicated by block 496.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
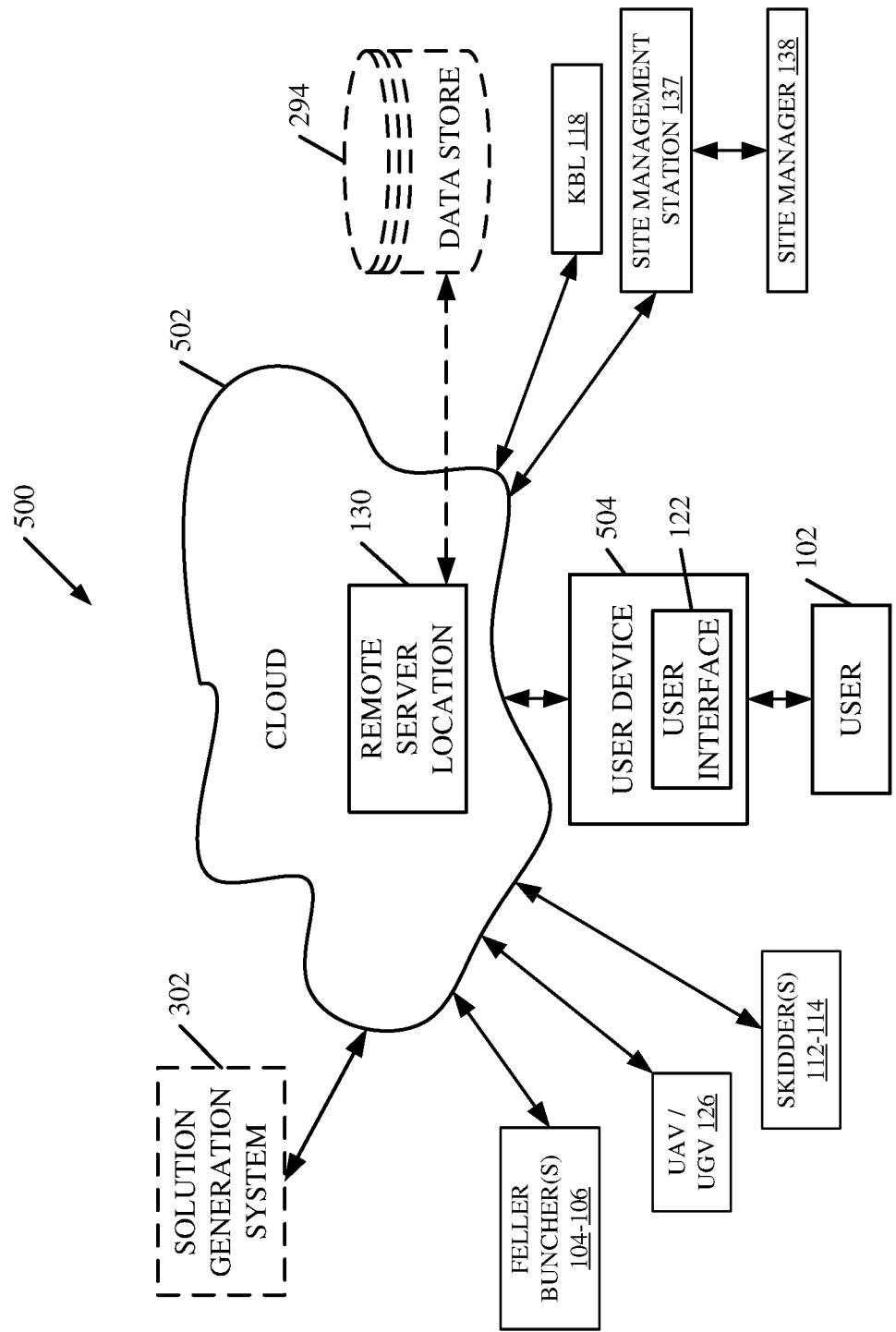
FIG. 7 is a block diagram showing one example of the architecture illustrated in FIG. 2, deployed in a remote server architecture.

FIG. 7 is a block diagram of the machines, shown in FIG. 1, except that they communicate with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous Figures as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 7, some items are similar to those shown in FIG. 2 and they are similarly numbered. FIG. 7 specifically shows that control system 134 or solution generation system 302 and data store 294 can be located at a remote server location 502. Therefore, access those systems through remote server location 502.

FIG. 7 also depicts another example of a remote server architecture. FIG. 7 shows that it is also contemplated that some elements of FIG. 2 are disposed at remote server location 502 while others are not. By way of example, data store 294 or other items can be disposed at a location separate from location 502, and accessed through the remote server at location 502. Regardless of where they are located, they can be accessed directly by the machines, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the machine comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the machine until the machine enters a covered location. The machine, itself, can then send the information to the main network.

It will also be noted that the elements of previous Figures, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
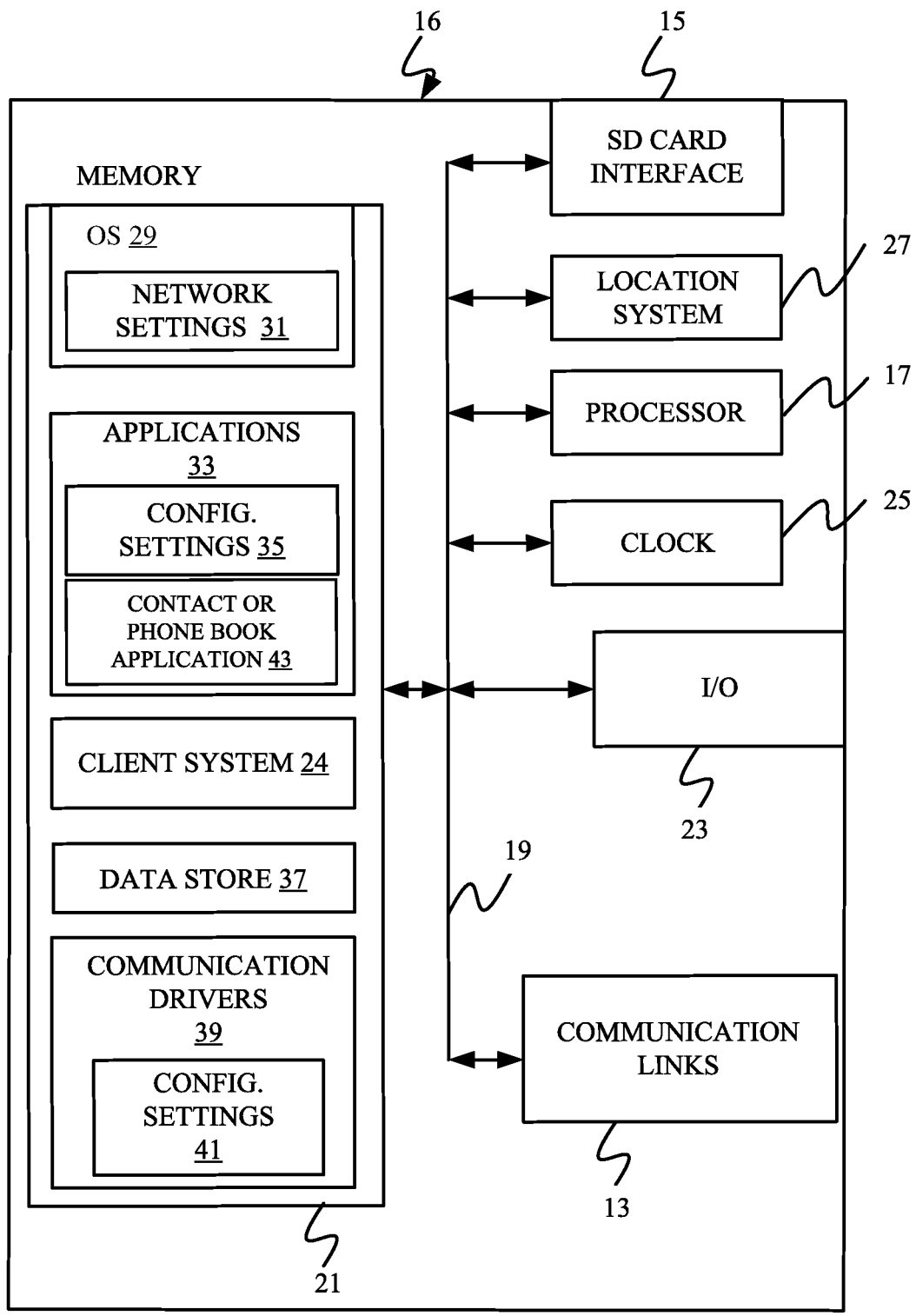
FIGS. 8-10 show examples of mobile devices that can be used in the architectures shown in the previous figures.
Figure 9:
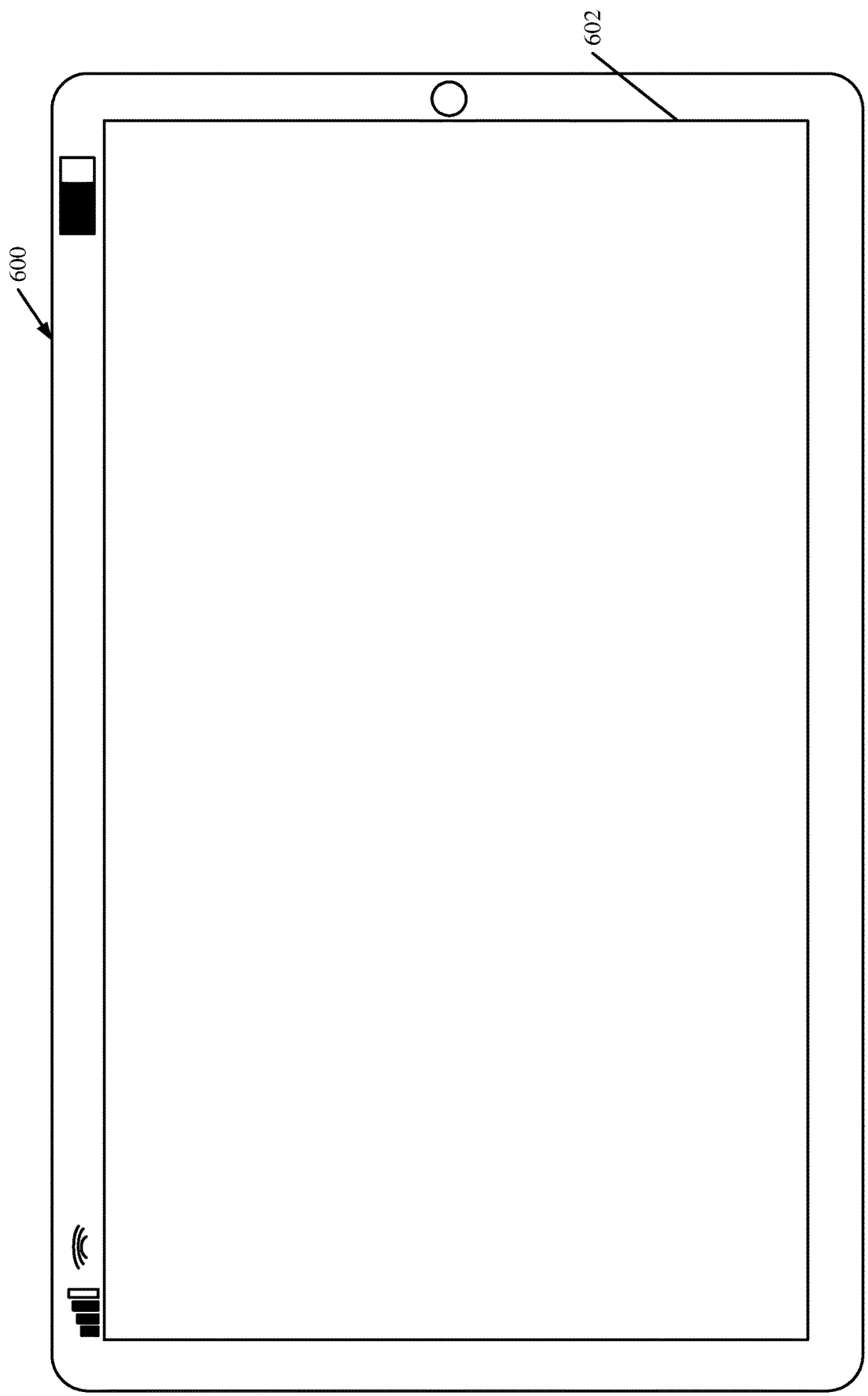
Figure 10:
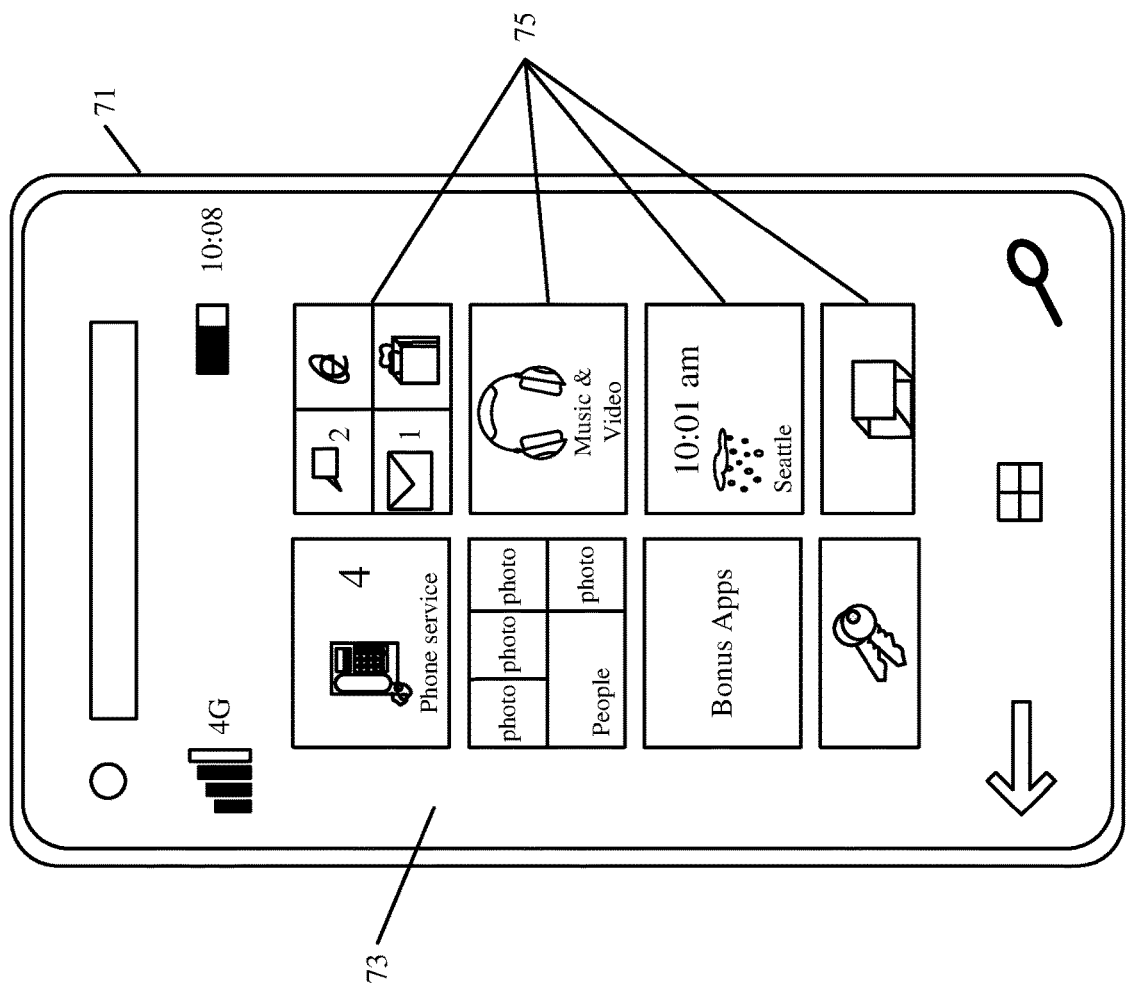

FIG. 8 is a simplified block diagram of one illustrative example of a handheld or mobile computing device that can be used as a user's or client's hand held device 16, in which the present system (or parts of it) can be deployed. For instance, a mobile device can be deployed in the operator compartment of the machines for use in detecting, generating, processing, or displaying the data. FIGS. 9-10 are examples of handheld or mobile devices.

FIG. 8 provides a general block diagram of the components of a client device 16 that can run some components shown in previous Figures, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors from previous Figures) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well. Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 9 shows one example in which device 16 is a tablet computer 600. In FIG. 9, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 10 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
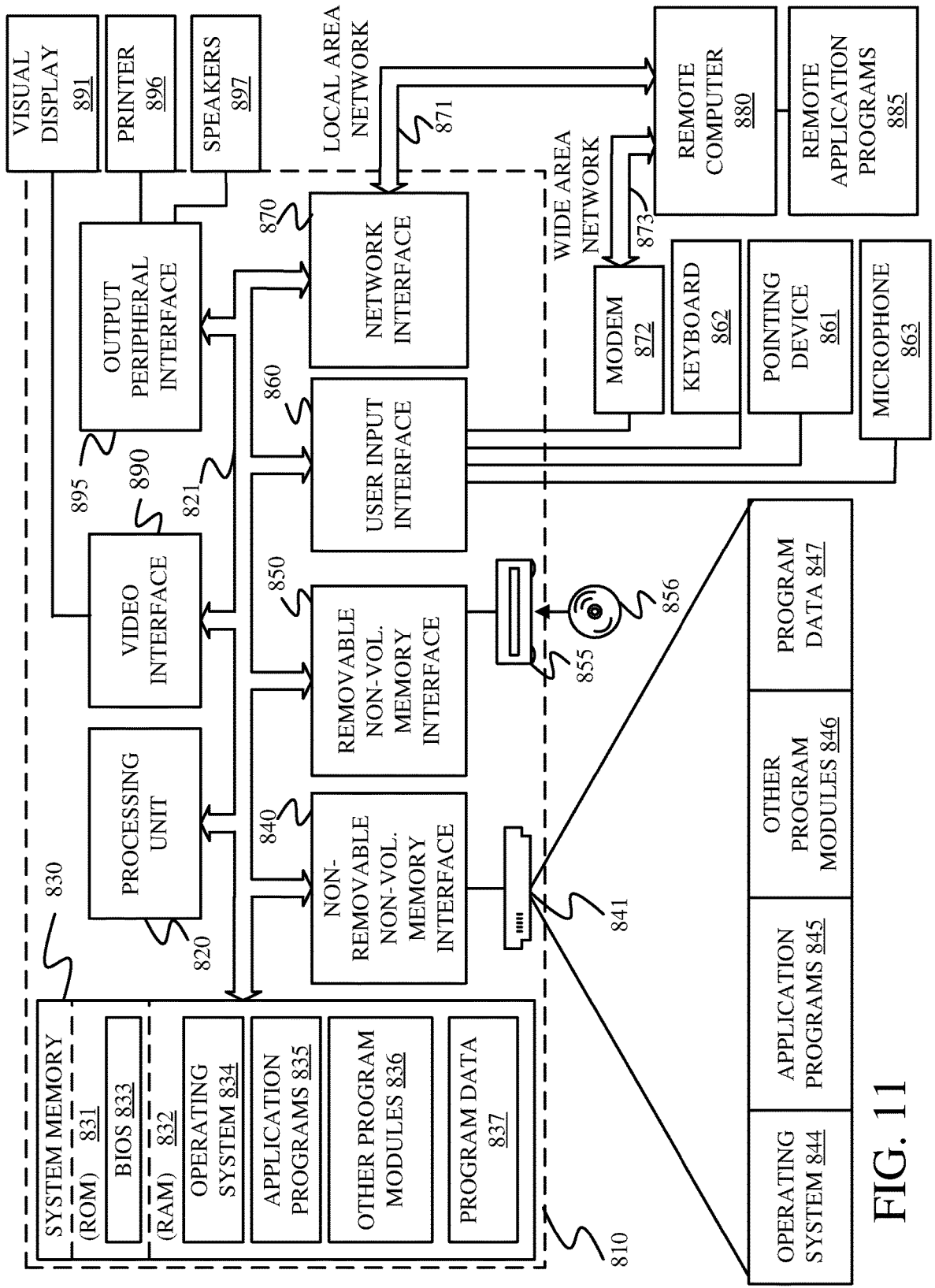
FIG. 11 is a block diagram showing one example of a computing environment that can be used in the architectures shown in the previous figures.

FIG. 11 is one example of a computing environment in which elements of previous Figures, or parts of them, (for example) can be deployed. With reference to FIG. 11, an example system for implementing some embodiments includes a general-purpose computing device in the form of a computer 810. Components of computer 810 may include, but are not limited to, a processing unit 820 (which can comprise processors from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, controller area network—CAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 11 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a forestry equipment control system, comprising:

a data acquisition system that obtains position information indicative of a geographic position of a bundle of trees felled by a first forestry machine at a forestry site and bundle characteristics indicative of physical characteristics corresponding to the bundle of trees;

a solution generator that generates a route solution output indicative of a route of a retrieval machine to retrieve the bundle of trees and transport the bundle of trees to a processing location based on the geographic position information and the bundle characteristics; and a control signal generator that receives the route solution output and generates a control signal to control the retrieval machine based on the route indicated by the route solution output.

Example 2 is the forestry equipment control system of any or all previous examples wherein the data acquisition system is configured to obtain position information indicative of a geographic position of a plurality of different bundles of trees.

FIG. 3 is the forestry equipment control system of any or all previous examples wherein the solution generator is configured to generate a plurality of different route solution outputs each being indicative of a route to one of the plurality of different bundles of trees.

Example 4 is the forestry equipment control system of any or all previous examples wherein the solution generator is configured to generate a bundle retrieval order solution output indicative of an order in which each of the plurality of different bundles of trees are to be retrieved.

Example 5 is the forestry equipment control system of any or all previous examples wherein the solution generator comprises:

equipment deployment logic configured to generate an equipment deployment solution output identifying different pieces of forestry equipment and indicating which of the identified pieces of forestry equipment are to be deployed to different locations at the forestry site.

Example 6 is the forestry equipment control system of any or all previous examples wherein the data acquisition system is configured to obtain machine characteristic information indicative of machine characteristics of a plurality of different retrieval machines and wherein the equipment deployment logic is configured to generate the equipment deployment solution output, based on the machine characteristic information, to indicate which of the plurality of different retrieval machines are to retrieve each of the plurality of different bundles and a route to take to retrieve each of the plurality of different bundles.

Example 7 is the forestry equipment control system of any or all previous examples wherein the retrieval machine includes a navigation system that automatically controls the retrieval machine to traverse a route and wherein the control signal generator comprises:

a navigation system controller configured to generate navigation control signals for automated control of the navigation system on the retrieval machine.

Example 8 is the forestry equipment control system of any or all previous examples wherein the control signal generator is configured to generate communication control signals to control a communication system to send control signals to the retrieval machine.

Example 9 is the forestry equipment control system of any or all previous examples wherein the first machine comprises a feller buncher and wherein the solution generator comprises:

feller buncher operation logic configured to generate a feller buncher operation solution output indicative of operation of the feller buncher.

Example 10 is the forestry equipment control system of any or all previous examples wherein the control signal generator comprises:

a feller buncher controller configured to generate control signals to control operation of the feller buncher to implement the feller buncher operation solution.

Example 11 is the forestry equipment control system of any or all previous examples wherein the solution generator comprises:

criteria identifier logic configured to identify a cost function and criterion on which the cost function is to be calculated; and running logic configured to recompute the cost function based on changes in the criterion until a stopping criterion is met.

Example 12 is the forestry equipment control system of any or all previous examples wherein the solution generator comprises:

machine learning logic configured to receive user feedback indicative of performance of the route solution output and to perform machine learning to modify the cost function based on the user feedback.

Example 13 is a method of controlling forestry equipment, comprising:

obtaining position information indicative of a geographic position of a bundle of trees felled by a first forestry machine at a forestry site and bundle characteristics indicative of physical characteristics corresponding to the bundle of trees;

using a processor to automatically generate a route solution output indicative of a route of a retrieval machine to retrieve the bundle of trees and transport the bundle of trees to a processing location based on the geographic position information and the bundle characteristics;

automatically generating a control signal to control the retrieval machine based on the route indicated by the route solution output; and sending the control signal to the retrieval machine to control the retrieval machine.

Example 14 is the method of any or all previous examples wherein obtaining position information comprises obtaining position information indicative of a geographic position of a plurality of different bundles of trees and wherein using a processor to automatically generate a route solution comprises:

automatically generating a plurality of different route solution outputs each being indicative of a route to one of the plurality of different bundles of trees.

Example 15 is the method of any or all previous examples wherein automatically generating a plurality of different route solution outputs comprises:

automatically generating a bundle retrieval order solution output indicative of an order in which each of the plurality of different bundles of trees are to be retrieved.

Example 16 is the method of any or all previous examples and further comprising:

using the processor to automatically generate an equipment deployment solution output identifying different pieces of forestry equipment and indicating which of the identified pieces of forestry equipment are to be deployed to different locations at the forestry site.

Example 17 is the method of any or all previous examples and further comprising:

obtaining machine characteristic information indicative of machine characteristics of a plurality of different retrieval machines and wherein generating the equipment deployment solution output comprises generating the equipment deployment solution output, based on the machine characteristic information, to indicate which of the plurality of different retrieval machines are to retrieve each of the plurality of different bundles and a route to take to retrieve each of the plurality of different bundles.

Example 18 is the method of any or all previous examples wherein the retrieval machine includes a navigation system that automatically controls the retrieval machine to traverse a route and wherein automatically generating the control signal comprises:

automatically generating navigation control signals for automated control of the navigation system on the retrieval machine.

Example 19 is the method of any or all previous examples wherein the first machine comprises a feller buncher and further comprising:

automatically generating a feller buncher operation solution output indicative of operation of the feller buncher; and automatically generating feller buncher control signals to control operation of the feller buncher to implement the feller buncher operation solution.

Example 20 is a forestry equipment control system, comprising:

a data acquisition system that obtains position information indicative of a geographic position of a bundle of trees felled by a first forestry machine at a forestry site and bundle characteristics indicative of physical characteristics corresponding to the bundle of trees;

a solution generator that generates a plurality of different route solution outputs indicative of a plurality of different routes of a retrieval machine to retrieve the bundle of trees and transport the bundle of trees to a processing location based on the geographic position information and the bundle characteristics, each different route solution output being generated based on a different set of criteria; and a control signal generator that receives operator selection of one of the route solution outputs and generates a control signal to control the retrieval machine based on the route indicated by the selected route solution output.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A forestry equipment control system, comprising:
a data acquisition system that obtains position information indicative of a geographic position of a bundle of trees felled by a first forestry machine at a forestry site and bundle characteristics indicative of physical characteristics corresponding to the bundle of trees;
a solution generation system configured to:
identify criteria indicative of an at least one variable of a cost of a retrieval machine in retrieving the bundle of trees and transporting the bundle of trees to a processing location; and
generate a route solution output indicative of a route of the retrieval machine to retrieve the bundle of trees and transport the bundle of trees to the processing location based on the geographic position information, the bundle characteristics, and the criteria to optimize the cost of the retrieval machine in retrieving the bundle of trees and transporting the bundle of trees to the processing location; and
a control signal generator that receives the route solution output and generates a control signal to control the retrieval machine based on the route indicated by the route solution output.

2. The forestry equipment control system of claim 1 wherein the data acquisition system is configured to obtain position information indicative of a geographic position of a plurality of different bundles of trees.

3. The forestry equipment control system of claim 2 wherein the solution generation system is configured to generate a plurality of different route solution outputs each being indicative of a route to one of the plurality of different bundles of trees.

4. The forestry equipment control system of claim 3 wherein the solution generation system is configured to generate a bundle retrieval order solution output indicative of an order in which each of the plurality of different bundles of trees are to be retrieved.

5. The forestry equipment control system of claim 3 wherein the solution generation system comprises:
equipment deployment logic configured to generate an equipment deployment solution output identifying different pieces of forestry equipment and indicating which of the identified pieces of forestry equipment are to be deployed to different locations at the forestry site.

6. The forestry equipment control system of claim 5 wherein the data acquisition system is configured to obtain machine characteristic information indicative of machine characteristics of a plurality of different retrieval machines and wherein the equipment deployment logic is configured to generate the equipment deployment solution output, based on the machine characteristic information, to indicate which of the plurality of different retrieval machines are to retrieve each of the plurality of different bundles and a route to take to retrieve each of the plurality of different bundles.

7. The forestry equipment control system of claim 2 wherein the retrieval machine includes a navigation system that automatically controls the retrieval machine to traverse a route and wherein the control signal generator comprises:
a navigation system controller configured to generate navigation control signals for automated control of the navigation system on the retrieval machine.

8. The forestry equipment control system of claim 1 wherein the control signal generator is configured to generate communication control signals to control a communication system to send control signals to the retrieval machine.

9. The forestry equipment control system of claim 1 wherein the first forestry machine comprises a feller buncher and wherein the solution generation system comprises:
feller buncher operation logic configured to generate a feller buncher operation solution output indicative of operation of the feller buncher.

10. The forestry equipment control system of claim 9 wherein the control signal generator comprises:
a feller buncher controller configured to generate control signals to control operation of the feller buncher to implement the feller buncher operation solution.

11. The forestry equipment control system of claim 10 wherein the solution generation system comprises:
criteria identifier logic configured to identify a cost function to be calculated based on the criteria; and
running logic configured to recompute the cost function based on changes in the criteria until a stopping criterion is met.

12. The forestry equipment control system of claim 11 wherein the solution generation system comprises:
machine learning logic configured to receive user feedback indicative of performance of the route solution output and to perform machine learning to modify the cost function based on the user feedback.

13. A method of controlling forestry equipment, comprising:
obtaining position information indicative of a geographic position of a bundle of trees felled by a first forestry machine at a forestry site and bundle characteristics indicative of physical characteristics corresponding to the bundle of trees;
identifying criteria indicative of an at least one variable of a cost of a retrieval machine in retrieving the bundle of trees and transporting the bundle of trees to a processing location;

using a processor to automatically generate a route solution output indicative of a route of the retrieval machine to retrieve the bundle of trees and transport the bundle of trees to the processing location based on the geographic position information, the bundle characteristics, and the criteria, to optimize the cost of the retrieval machine in retrieving the bundle of trees and transporting the bundle of trees to the processing location;
automatically generating a control signal to control the retrieval machine based on the route indicated by the route solution output; and
sending the control signal to the retrieval machine to control the retrieval machine.

14. The method of claim 13 wherein obtaining position information comprises obtaining position information indicative of a geographic position of a plurality of different bundles of trees and wherein using a processor to automatically generate a route solution comprises:
automatically generating a plurality of different route solution outputs each being indicative of a route to one of the plurality of different bundles of trees.

15. The method of claim 14 wherein automatically generating a plurality of different route solution outputs comprises:
automatically generating a bundle retrieval order solution output indicative of an order in which each of the plurality of different bundles of trees are to be retrieved.

16. The method of claim 14 and further comprising:
using the processor to automatically generate an equipment deployment solution output identifying different pieces of forestry equipment and indicating which of the identified pieces of forestry equipment are to be deployed to different locations at the forestry site.

17. The method of claim 16 and further comprising:
obtaining machine characteristic information indicative of machine characteristics of a plurality of different retrieval machines and wherein generating the equipment deployment solution output comprises generating the equipment deployment solution output, based on the machine characteristic information, to indicate which of the plurality of different retrieval machines are to retrieve each of the plurality of different bundles and a route to take to retrieve each of the plurality of different bundles.

18. The method of claim 14 wherein the retrieval machine includes a navigation system that automatically controls the retrieval machine to traverse a route and wherein automatically generating the control signal comprises:
automatically generating navigation control signals for automated control of the navigation system on the retrieval machine.

19. The method of claim 13 wherein the first forestry machine comprises a feller buncher and further comprising:
automatically generating a feller buncher operation solution output indicative of operation of the feller buncher; and
automatically generating feller buncher control signals to control operation of the feller buncher to implement the feller buncher operation solution.

20. A forestry equipment control system, comprising:
a data acquisition system that obtains position information indicative of a geographic position of a bundle of trees felled by a first forestry machine at a forestry site and bundle characteristics indicative of physical characteristics corresponding to the bundle of trees;
a solution generator that generates a plurality of different route solution outputs indicative of a plurality of different routes of a retrieval machine to retrieve the bundle of trees at the geographic position and transport the bundle of trees to a processing location based on the geographic position information and the bundle characteristics, each different route solution output being generated based on a different set of criteria, each different set of criteria indicative of an at least one variable of a cost of the retrieval machine to retrieve the bundle of the trees and transport the bundle of trees to the processing location; and
a control signal generator that receives operator selection of one of the route solution outputs and generates a control signal to control the retrieval machine based on the route indicated by the selected route solution output.

* * * * *